(12) United States Patent
Higgs et al.

(10) Patent No.: US 7,494,194 B2
(45) Date of Patent: Feb. 24, 2009

(54) REMOTE CONTROL TRAIN-LINE BRAKING SYSTEM

(75) Inventors: David B. Higgs, Bradford, PA (US); Ronald A. Worden, Shinglehouse, PA (US)

(73) Assignee: Control Chief Corporation, Bradford, PA (US)

( * ) Notice: Subject to any disclaimer, the term of this patent is extended or adjusted under 35 U.S.C. 154(b) by 1063 days.

(21) Appl. No.: 10/231,335

(22) Filed: Aug. 30, 2002

(65) Prior Publication Data

US 2003/0042788 A1   Mar. 6, 2003

Related U.S. Application Data

(60) Provisional application No. 60/316,480, filed on Aug. 31, 2001.

(51) Int. Cl.
*B60T 7/00* (2006.01)

(52) U.S. Cl. .................. 303/15; 303/7; 303/128

(58) Field of Classification Search .......... 303/3, 303/7, 128, 20, 15
See application file for complete search history.

(56) References Cited

U.S. PATENT DOCUMENTS

| | | | | |
|---|---|---|---|---|
| 3,583,771 A | * | 6/1971 | Dressler, Jr. | 303/20 |
| 3,799,623 A | * | 3/1974 | Wickham et al. | 303/20 |
| 3,970,348 A | * | 7/1976 | Maskery | 303/22.7 |
| 4,013,323 A | * | 3/1977 | Burkett | 303/20 |
| 4,052,109 A | * | 10/1977 | Nagase et al. | 303/25 |
| 4,105,257 A | * | 8/1978 | Engle et al. | 303/15 |
| 4,586,584 A | * | 5/1986 | Auman et al. | 180/271 |
| 4,598,953 A | * | 7/1986 | Wood et al. | 303/3 |
| 5,412,572 A | * | 5/1995 | Root et al. | 701/70 |
| 5,740,029 A | * | 4/1998 | Ferri et al. | 303/9 |
| 5,791,744 A | * | 8/1998 | Wood et al. | 303/7 |
| 6,135,573 A | * | 10/2000 | Kushnir et al. | 303/15 |
| 6,158,821 A | * | 12/2000 | Kushnir et al. | 303/3 |
| 6,238,010 B1 | * | 5/2001 | Barber et al. | 303/7 |
| 6,964,457 B2 | * | 11/2005 | Kettle, Jr. | 303/15 |

* cited by examiner

*Primary Examiner*—Bradley T King
(74) *Attorney, Agent, or Firm*—The Webb Law Firm

(57) ABSTRACT

A remote train-line braking control system includes first and second air supplies and a first control valve connected in fluid communication between the first air supply and an air pressure controlled diaphragm that controls a fluid pressure supplied to a train-line braking system. A second control valve is connected in fluid communication between the second air supply and the first control valve. The first and second control valves are operable for individually connecting the diaphragm to the first air supply, the second air supply and atmospheric pressure. The diaphragm is responsive to the pressure of air supplied thereto for controlling a fluid pressure supplied to the train-line braking system. When the diaphragm is exposed to atmospheric pressure, the brakes of the train-line braking system are fully applied.

3 Claims, 3 Drawing Sheets

REMOTE CONTROL TRAIN-LINE BRAKING SYSTEM

CROSS REFERENCE TO RELATED APPLICATION

Figure 1:
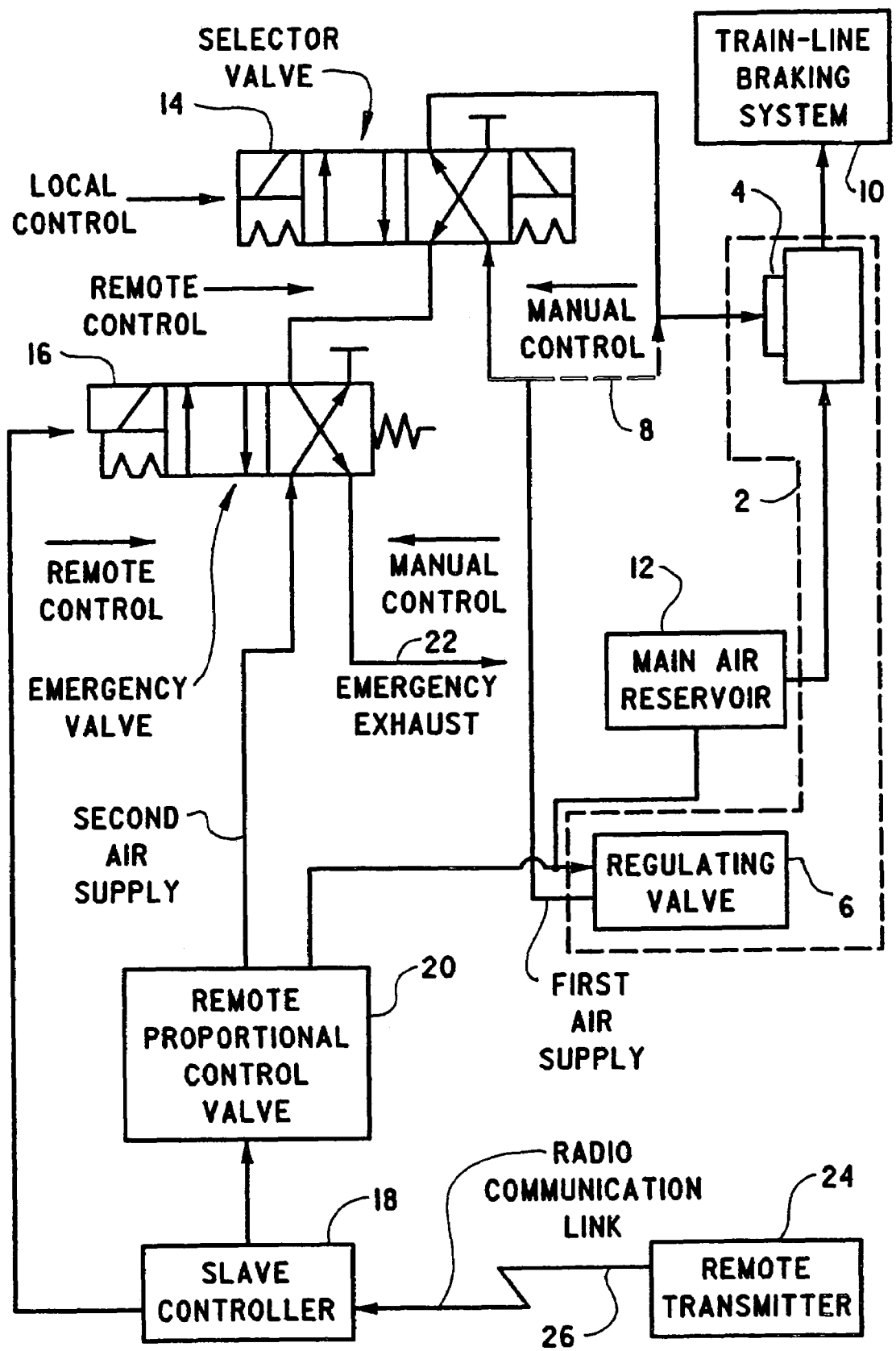

This application claims priority from U.S. Provisional Patent Application Serial No. 60/316,480, filed Aug. 31, 2001, entitled "Remote Control Brake System For A Locomotive".

BACKGROUND OF THE INVENTION

1. Field of the Invention

The present invention relates to remotely controlling a train-line braking system and, more specifically, to remotely controlling a type 26C self-lapping relay valve that controls an air pressure supplied to the train-line braking system.

2. Description of Related Art

Heretofore, it has been necessary to install a large relay valve and associated pipe work to provide remote control of the airflow to a locomotive brake pipe utilized to control a train-line braking system. This relay valve and pipe work form part of a radio remote control system where the relay valve is controlled by reference air derived from the radio remote control system. The changeover from local manual control to radio remote control is accomplished by means of this additional pneumatic hardware. The installation of this relay valve and pipe work, however, requires extensive modification to the locomotive brake system and is expensive and time consuming to implement.

It is, therefore, an object of the present invention is to overcome the above problem and others by providing a system wherein the installation of equipment required to implement remote train-line brake control is simplified and is without the need for extensive locomotive brake pipe modifications or the addition of an expensive relay valve and related pipe work.

SUMMARY OF THE INVENTION

The present invention is a remote train-line braking control system that includes first and second pressure controllable air supplies, means for controlling a pressure of air supplied to a train-line braking system as a function of the pressure of one of the first air supply and the second air supply and means for individually connecting the control means in fluid communication with the first air supply, the second air supply and a third air supply. The third air supply can be atmospheric air or any other air reservoir that has a sufficiently low air pressure to cause the control means to change the pressure of the air supplied to the locomotive braking system whereupon the brakes of the train-line braking system are fully applied.

The control means includes a relay valve having a control diaphragm in fluid communication with the connecting means. The connecting means includes a selector valve in fluid communication with the first air supply and an emergency valve in fluid communication with the selector valve and the second air supply. The selector valve is operative to connect the first air supply in fluid communication with the control means or to connect the emergency valve in fluid communication with the control means. The emergency valve is operative to connect the second air supply in fluid communication with the selector valve or to connect the selector valve in fluid communication with the third air supply.

The system includes means for controlling the operation of the selector valve and the emergency valve to (i) connect the first air supply in fluid communication with the control means, (ii) connect the second air supply in fluid communication with the control means and (iii) connect the third air supply to the control means. The operation of each of the selector valve and the emergency valve can be controlled by moving it between a first position and a second position.

The control means includes a processor-based controller running under the control of a software program that causes the controller to control the pressure of the second air supply and to control the operation of the emergency valve. Running under the control of the control program, the controller is responsive to at least one signal received from a transmitter for controlling the pressure of the second air supply and/or for controlling the operation of the emergency valve. The at least one signal can be a radio signal. The operation of the selector valve can be controlled locally, i.e., by an operator located on board the locomotive.

The invention is also a method of remotely controlling a train-line braking system that includes providing a first control valve coupled in fluid communication between a first pressure controllable air supply and a relay valve that is responsive to a control pressure for controlling a pressure applied by the brakes of a train-line braking system as a function of the control pressure and providing a second control valve coupled in fluid communication between a second pressure controllable air supply and the first control valve. The first and second control valves are set to first positions whereupon the first air supply is the source of the control pressure. The first and second control valves are then set to second positions whereupon the first air supply is terminated as the source of the control pressure and the second air supply becomes the source of the control pressure. Lastly, the second control valve is set to the first position while the first control valve is in its second position whereupon the second air supply is terminated as the source of the control pressure and the control pressure changes in a manner that causes the brakes of the train-line braking system to be applied, preferably fully applied. The positions of the control valves can be set in response to at least one radio signal.

Lastly, the invention is a remote train-line braking control system that includes first and second sources of fluid pressure and a first control valve connected in fluid communication between the first fluid pressure source and a fluid pressure controlled diaphragm that controls a fluid pressure supplied to the train-line braking system. A second control valve is connected in fluid communication between the second fluid pressure source and the first control valve. A slave controller is provided that is responsive to control signals for controlling at least one of the control valves whereupon the diaphragm is individually connectable in fluid communication with the first fluid pressure source, the second fluid pressure source and atmospheric pressure.

The control valves are controlled whereupon first positions of the control valves connect the diaphragm in fluid communication with the first fluid pressure source, second positions of the control valves connect the diaphragm in fluid communication with the second fluid pressure source and the first and second positions of the second and first control valves, respectively, connect the diaphragm in fluid communication with atmospheric pressure.

The diaphragm controls the fluid pressure supplied to the train-line braking system from a main fluid reservoir. The first source of fluid pressure is an output of a regulating valve that receives its fluid from the main fluid reservoir. The second source of fluid pressure is an output of a remote proportional control valve that receives its fluid from the main fluid reservoir. The remote proportional control valve is responsive to the slave controller for adjusting the fluid pressure of the second source of fluid pressure.

DETAILED DESCRIPTION OF THE DRAWINGS

Figure 2:
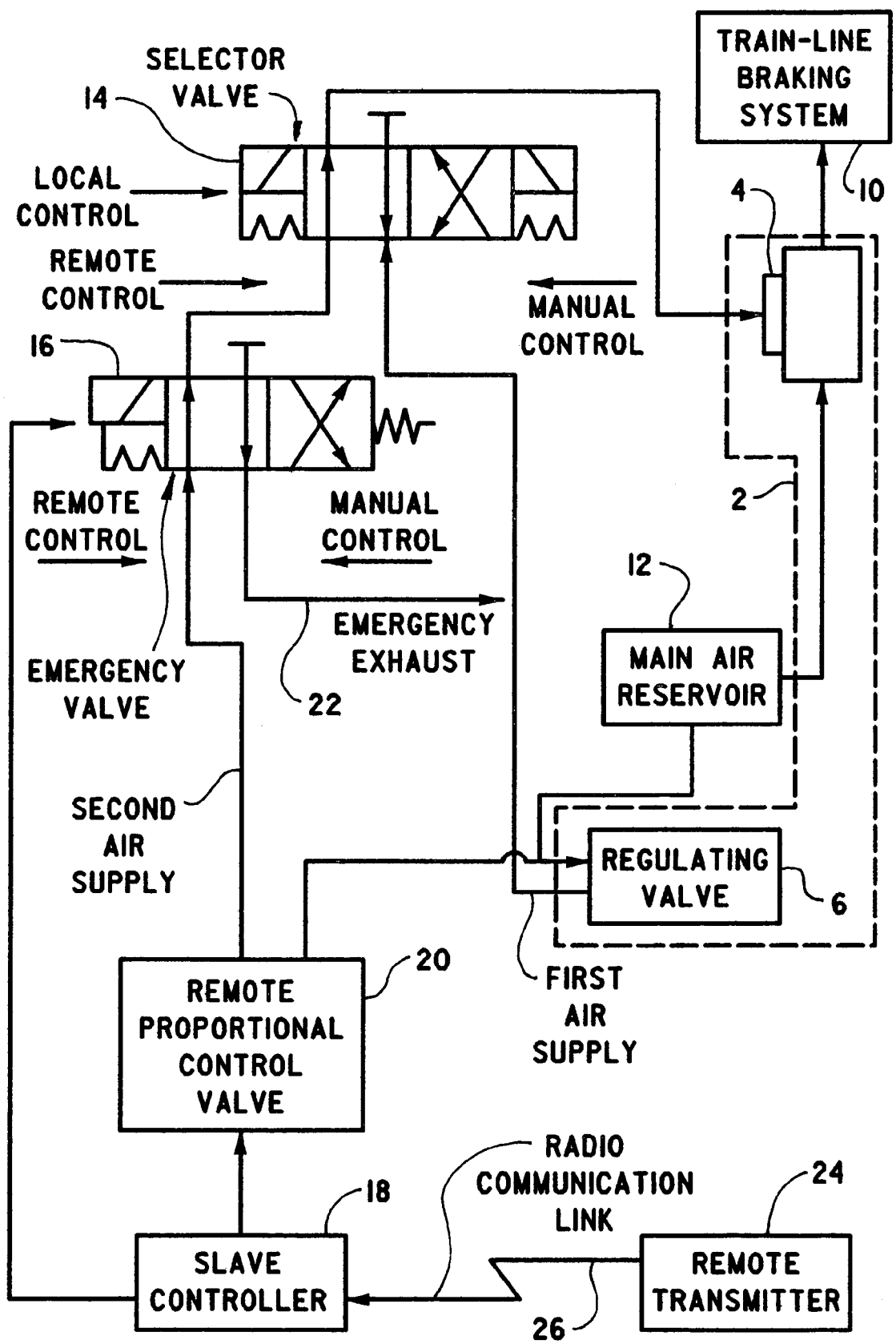
Figure 3:
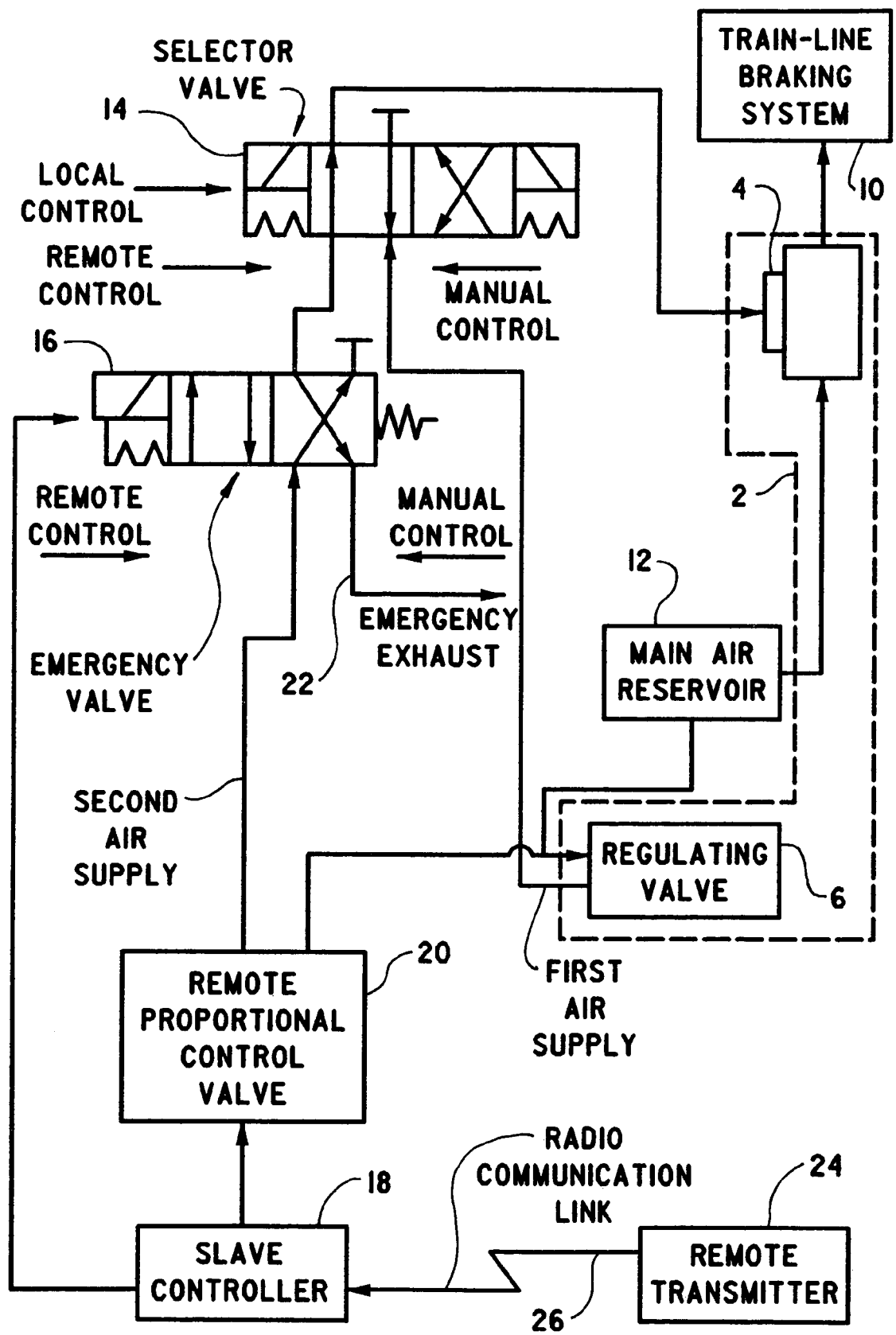

FIGS. 1-3 are block diagrams of the remote locomotive brake control system of the present invention including the valves thereof in various states.

DETAILED DESCRIPTION OF THE INVENTION

With reference to FIG. 1, a 26-L braking system used with a train-line braking system is well known to those skilled in the art. Accordingly, the construction and operation of the 26-L braking system will not be described herein and reference is made only to a diaphragm 4 and a regulating valve 6 of a type 26C relay valve 2 which forms part of the 26-L braking system.

In normal operation of relay valve 2 absent the present invention, a first air supply is coupled from regulating valve 6 directly to diaphragm 4 of relay valve 2 via connection 8, shown by a dashed line in FIG. 1. When varied proportionally by regulating valve 6, the first air supply directly controls the air pressure supplied to a train-line braking system 10 from a main air reservoir 12. The pressure applied by the first air supply to diaphragm 4 controls the air pressure supplied to train-line braking system 10 and, hence, the amount of brake pressure being applied thereby.

The present invention dispenses with the large relay valve and associated pipe work and ancillary components necessary for implementing the prior art remote control system for the 26-L braking system. This traditional hardware is replaced by two control valves designed to provide direct control of relay valve 2. These two control valves include a selector valve 14 that is controlled locally, e.g., by an operator located on board the train, and an emergency valve 16 under the control of a slave controller 18.

In use, connection 8 is terminated and selector valve 14 is connected in fluid communication between the first air supply and diaphragm 4 of relay valve 2. The first air supply can initiate in regulating valve 6 which receives its supply of pressurized air from main air reservoir 12. However, this is not to be construed as limiting the invention. The pressure of the first air supply can be manually controlled via regulating valve 6 by an operator located on board the train in a manner known in the art.

Emergency valve 16 is connected in fluid communication between a second air supply and selector valve 14. The second air supply can initiate in a remote proportional control valve 20 which receives its supply of pressurized air from main air reservoir 12. However, this is not to be construed as limiting the invention. The pressure of the second air supply can be controlled by remote proportional control valve 20 under the control of slave controller 18.

When manual control operation is desired, selector valve 14 is set to its first manual position by an operator located on board the train and emergency valve 16 is set to its first manual position under the control of slave controller 18 whereupon the first air supply is fluidly coupled to diaphragm 4 and the second air supply is isolated from selector valve 14 and, hence, diaphragm 4.

With reference to FIG. 2, when remote control operation is desired, selector valve 14 is set to its second remote position by the operator located on board the train and emergency valve 16 is set to its second remote position under the control of slave controller 18 whereupon the second air supply is fluidly coupled to diaphragm 4 via selector valve 14 and the first air supply is isolated from diaphragm 4. When varied proportionally by remote proportional control valve 20 under the control of slave controller 18, the second air supply controls the air pressure supplied to train-line braking system 10.

With reference to FIG. 3, when emergency operation is desired, emergency valve 16 is set to its first manual position by the operator located on board the locomotive and selector valve 14 is set to its second remote position under the control of slave controller 18. When selector valve 14 and emergency valve 16 are in these positions, diaphragm 4 is vented to a third air supply or atmosphere via an emergency exhaust 22 and the first and second air supplies are isolated from diaphragm 4. Venting diaphragm 4 of relay valve 2 to atmosphere causes relay valve 2 to terminate the supply of pressurized air to train-line braking system 10 from main air reservoir 12 whereupon the brakes of train-line braking system 10 are fully applied.

The position of selector valve 14 can be set manually or via electrical or fluid activation locally by the operator located on board the train. Emergency valve 16 can be set under the control of slave controller 18 in response to radio signals received from a remote transmitter 24 under the control of a user thereof via a radio communication link 26. Details regarding the features of remote transmitter 24 and slave controller 18 to effect control of remote proportional control valve 20 and the position of emergency valve 16 are well known to those of ordinary skill in the art and, therefore, will not be described in detail herein to simplify the description. Generally, however, slave controller 18 includes a processor-based controller running under the control of a software program that causes the controller to control the pressure of the second air supply and to control the operation of emergency valve 16. Running under the control of the control program, slave controller 18 is responsive to at least one radio signal received from remote transmitter 24 for controlling the pressure of the second air supply and/or for controlling the operation of the emergency valve 16. To enable slave controller 18 to receive radio signals from remote transmitter 24, slave controller 18 includes a radio receiver (not shown) for receiving the radio signals from remote transmitter 24. Similarly, remote transmitter 24 includes a processor-based controller running under the control of a software program that causes the controller to transmit to slave controller 18 radio signals modulated with control commands that cause slave controller 18 to control the pressure of the second air supply and/or control the operation of emergency valve 16.

In one non-limiting embodiment, selector valve 14 is an electrically actuated—mechanically retained valve while emergency valve 16 is an electrically actuated—spring return valve. However, this is not to be construed as limiting the invention.

As can be seen, the present invention simplifies the installation of equipment required to implement remote train-line brake control without the need for extensive locomotive brake pipe modifications or the addition of an expensive relay valve. To this end, in one embodiment, selector valve 14 and emergency valve 16 are attached to a cover (not shown) of relay valve 2. However, this is not to be construed as limiting the invention.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention is claimed to be:

1. A remote train-line braking control system comprising:
a first pressure controllable air supply;
a second pressure controllable air supply;
a 26C relay valve having a control diaphragm for controlling a pressure of air supplied to a train line braking system;
connecting means for connecting the control diaphragm in fluid communication with the first air supply, the second air supply and a third air supply one at a time, wherein the connecting means includes a selector valve in fluid communication with the first air supply and an emergency valve in fluid communication with the selector valve and the second air supply, the selector valve is operative to connect the first air supply in fluid communication with the control diaphragm or to connect the emergency valve in fluid communication with the control diaphragm, the emergency valve is operative to connect the second air supply in fluid communication with the selector valve or to connect the third air supply in fluid communication with the selector valve;
means for controlling the operation of the selector valve and the emergency valve to (i) connect the first air supply in fluid communication with the control diaphragm, (ii) connect the second air supply in fluid communication with the control diaphragm and (iii) connect the third air supply to the control diaphragm, wherein:
the control means includes a processor-based controller running under the control of a software program that causes the controller to control the pressure of the second air supply and to control the operation of the emergency valve;
running under the control of the control program, the controller is responsive to at least one signal received from a transmiffer for controlling at least one of the pressure of the second air supply and the operation of the emergency valve; and
the at least one signal is a radio signal.

2. The system of claim 1, wherein the third air supply is atmospheric air.

3. The system of claim 1, wherein the operation of each of the selector valve and the emergency valve is controlled by moving it between a first position and a second position.

* * * * *

UNITED STATES PATENT AND TRADEMARK OFFICE
CERTIFICATE OF CORRECTION

| | | |
|---|---|---|
| PATENT NO. | : 7,494,194 B2 | Page 1 of 1 |
| APPLICATION NO. | : 10/231335 | |
| DATED | : February 24, 2009 | |
| INVENTOR(S) | : Higgs et al. | |

It is certified that error appears in the above-identified patent and that said Letters Patent is hereby corrected as shown below:

Column 6, Line 12, Claim 1, "a transmiffer" should read -- a transmitter --

Signed and Sealed this

Twenty-sixth Day of May, 2009

JOHN DOLL
*Acting Director of the United States Patent and Trademark Office*